(12) United States Patent
Jancsó

(10) Patent No.: US 7,257,879 B1
(45) Date of Patent: Aug. 21, 2007

(54) COMBINATION APPARATUS FOR MACHINING MATERIAL WITH A MILLING CUTTER AND A LASER

(75) Inventor: Alex Jancsó, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 0 days.

(21) Appl. No.: 11/625,950

(22) Filed: Jan. 23, 2007

(30) Foreign Application Priority Data

Jan. 24, 2006 (DE) .................. 10 2006 003 682

(51) Int. Cl.
  B23P 23/00 (2006.01)
  B23K 26/38 (2006.01)
(52) U.S. Cl. .................. 29/566; 29/56.5; 219/121.67; 219/121.82; 219/121.84; 219/121.75; 408/22; 408/701
(58) Field of Classification Search .................. 29/566, 29/50, 52–53, 54–55, 56.5; 219/121.67, 219/121.82, 121.84, 121.75; 409/131–132, 409/135–136; 408/16, 1 R, 22, 24, 26, 30, 408/701
See application file for complete search history.

(56) References Cited

U.S. PATENT DOCUMENTS

| | | | | |
|---|---|---|---|---|
| 5,160,824 A | * | 11/1992 | Babel | 219/121.68 |
| 5,262,613 A | * | 11/1993 | Norris et al. | 219/121.68 |
| 5,376,061 A | * | 12/1994 | Suzuki | 483/13 |
| 5,409,376 A | * | 4/1995 | Murphy | 408/701 |
| 5,508,490 A | * | 4/1996 | Klose | 219/121.62 |
| 5,525,776 A | * | 6/1996 | Okamoto | 219/121.68 |
| 5,906,459 A | * | 5/1999 | Thomas et al. | 409/132 |
| 6,337,464 B1 | * | 1/2002 | Takaoka et al. | 219/121.78 |
| 6,393,687 B1 | * | 5/2002 | Friedrich | 29/560 |
| 6,476,347 B1 | * | 11/2002 | Whittenbury | 219/121.67 |
| 6,593,541 B1 | * | 7/2003 | Herren | 219/121.67 |
| 6,666,630 B2 | * | 12/2003 | Zimmermann et al. | 409/132 |
| 2003/0184768 A1 | * | 10/2003 | Fujishima et al. | 356/614 |

FOREIGN PATENT DOCUMENTS

| | | |
|---|---|---|
| DE | 41 13 633 | 10/1992 |
| DE | 199 10 880 | 9/2000 |
| DE | 101 28 536 | 1/2003 |
| JP | 55-125954 A * | 9/1980 |
| JP | 61-164738 A * | 7/1986 |
| JP | 5-118185 A * | 5/1993 |
| JP | 11-114741 A * | 4/1999 |

OTHER PUBLICATIONS

Patent Abstracts of Japan, Publication No. 55125954 published Sep. 29, 1980, "Drilling Method" Fujitsu Ltd.
Patent Abstracts of Japan, Publication No. 03060888 published Mar. 15, 1991, "Drilling Method of Using Laser Beam" Mitsubishi Heavy Ind Ltd.
Patent Abstracts of Japan, Publication No. 11114741 published Apr. 27, 1999, "Combined Machining Center" Kitamura Mach Co Ltd.

* cited by examiner

*Primary Examiner*—Erica Cadugan
(74) *Attorney, Agent, or Firm*—Reed Smith LLP

(57) ABSTRACT

The invention is directed to an apparatus for cutting material by means of a milling cutter and laser radiation. The apparatus comprises a milling unit, a work spindle, a milling cutter, a laser, deflecting elements, focusing optics, and a work table. According to the invention, a workpiece can be milled and lasered simultaneously or successively at the same cutting location in that the laser beam is coupled into a channel coaxial to the mill axis.

5 Claims, 2 Drawing Sheets

COMBINATION APPARATUS FOR MACHINING MATERIAL WITH A MILLING CUTTER AND A LASER

CROSS-REFERENCE TO RELATED APPLICATION

This application claims priority of German Application No. 10 2006 003 682.4, filed Jan. 24, 2006, the complete disclosure of which is hereby incorporated by reference.

BACKGROUND OF THE INVENTION a) Field of the Invention

The invention is directed to an apparatus by which material can be partially removed from a workpiece by means of a milling cutter and a laser. An apparatus of this type is known generically from DE 199 10 880 A1.

b) Description of the Related Art

DE 41 13 633 A1 proceeds from a prior art in which workpieces which are to be worked by other machining methods in addition to laser machining are worked in different machining devices. The workpiece must be transported between machining devices and oriented to the tool in each machining device.

With the aim of providing a machining device by which, besides laser machining, other machining methods can be carried out without transporting or displacing the workpiece, DE 41 13 633 A1 suggests that two quills, one of which is provided for the laser head and the other for fastening another tool, communicate with a shared drive. Therefore, the same control unit can be used for carrying out machining processes.

The abstract to Japanese Patent Application JP 11114741 discloses a combination machining installation in which either a laser or mechanical tools such as drills and milling cutters, in particular also an end mill cutter, are used alternatively for machining workpieces. In order to use the different tools, the drill or the cutter is fastened directly to a spindle of a spindle head. To use the laser, a module is fastened to the spindle and, in this position, directs a laser beam to the workpiece in coaxial direction relative to the spindle, the laser beam being coupled in on the input side. All of the tools have the same working direction relative to the workplace because they are all oriented to the same spindle. Here also, the different machining methods can only be carried out successively with respect to time.

A machine tool for alternative working of workpieces either by laser radiation or by cutting tools is known from DE 199 10 880 A1. A milling head and a laser radiation source are jointly fastened to a headstock which is supported on an X-Y table and enables a horizontal movement of the tool relative to the workpiece. The laser radiation source is connected by a beam delivery channel to a laser head which is arranged laterally at the milling head. A scanner system which guides the laser beam over the workpiece surface in a focused manner is fastened to the laser head. Removal of material by layer is mentioned as a possible application of the machine tool. The individual machining methods are carried out successively in time in this case also.

It is known that special materials, e.g., ceramics or certain steels, can advantageously be removed by laser-assisted cutting. A laser beam partially heats the workpiece around a cutting zone to a temperature which facilitates cutting of the material. With laser-assisted turning of the workpiece on a lathe in which the workpiece is rotated and a cutting tool with only one knife is merely advanced, the laser beam is directed to the workpiece directly in front of the knife in the forward feed direction. This means that the laser beam maintains the same relative position with respect to the cutting tool during machining and can therefore be fixed relative to the cutting tool.

With laser-assisted milling, the heating of the cutting zone is more difficult, since a milling cutter usually has a plurality of tips, all of which simultaneously participate in the removal of material.

In the milling machine which is disclosed in DE 101 28 536 A1 and which can be used for laser-assisted milling of a three-dimensional surface, particularly a free-form surface, a laser device is arranged at an adjustable fastening so as to be swivelable around a spherical cutter.

To summarize: Basically two different groups of devices (machine tools) having a laser and a cutting tool are known from the prior art.

In devices of the first group in which cutting removal of material is assisted by heating with a laser, the laser radiation and a conventional chip-removing tool are used at the same time, and the laser radiation impinges on the workpiece outside of the instantaneous machining area of the chip-removing tool, i.e., for a milling cutter outside the outer circumference. Since the laser and the milling cutter work adjacent areas, the laser head and the milling cutter must also be positioned adjacent to one another.

In devices of the second group in which material is removed alternatively either by laser or by a cutting tool, the laser radiation and a conventional chip-removing tool are used successively with respect to time at the same machining location or at different machining locations. The machining methods proceed without influencing one another. When the machining method is changed in order to work at the same machining location, the position of the tools relative to the workpiece must be changed. Devices of this kind are used for multi-layer workpieces from which material must be partially removed over at least two layers of different materials. A chip-removing method is advantageous at least for the material of the first layer, and the material of the following layers can be advantageously removed with a cutting beam.

The devices which are known from and described in the prior art have the disadvantage that the lasers cannot begin until after the volume to be removed by milling has been removed (two work steps), i.e., the entire machining area must be gone over twice. The machining time (cycle time) is increased compared to a method in which the desired volume is removed by going over the entire machining area a single time (one work step).

OBJECT AND SUMMARY OF THE INVENTION

It is the primary object of the invention to provide an apparatus by which grooves may be milled in a workpiece by means of a chip-removing tool and the workpiece can be cut or perforated at the same time along the grooves by a laser beam.

This object is met according to the invention by an apparatus for cutting material comprising a milling unit, a milling cutter and a motor-driven work spindle for receiving the milling cutter, a laser connected to an optical transmission system, a work table for clamping the workpiece and driving units and controlling units for generating and controlling the relative movement of the milling unit and work table in three spatial dimensions and for controlling the laser. A hollow channel is provided in the milling cutter coaxial to the mill axis. The optical system is provided in the milling cutter coaxial to the mill axis and the optical transmission system for coupling the laser beam coaxially into the channel.

The invention will be described more fully in the following with reference to an embodiment example.

DESCRIPTION OF THE PREFERRED EMBODIMENTS

Figure 1:
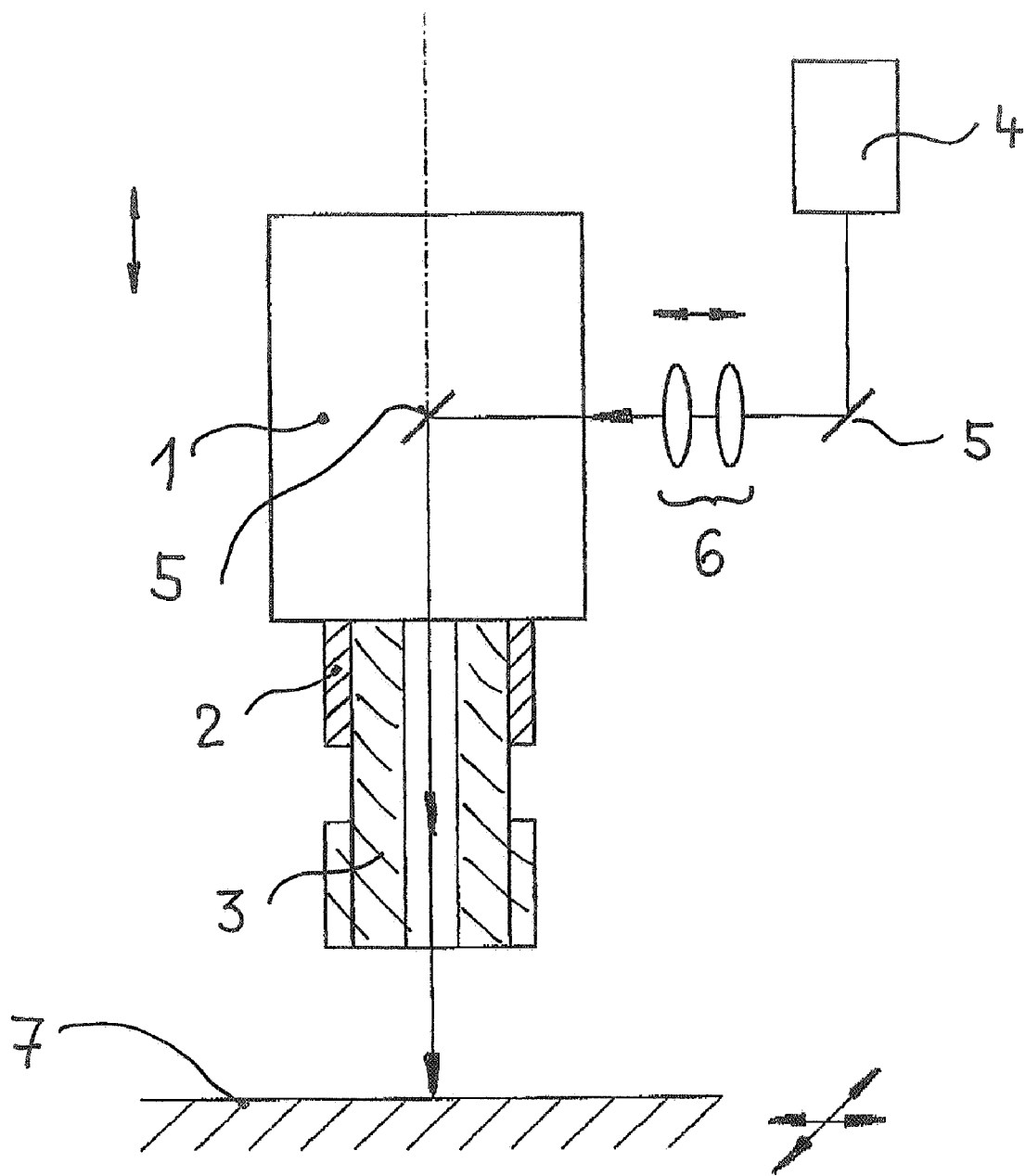
FIG. 1 is a schematic drawing of an apparatus according to the invention.

FIG. 1 shows a milling unit 1 with a motor-driven work spindle 2 for receiving a hollow milling cutter 3, in particular an end mill, a laser 4 connected to an optical transmission system, with deflecting elements 5 for coupling the laser beam into the hollow milling cutter 3, adjustable focusing optics 6, and a work table 7 for clamping the tool. Guides, driving units and controlling units for generating and controlling the relative movement of the milling unit 1 and work table 7 in three spatial dimensions and for controlling the laser 4 and adjustable focusing optics 6 are not shown. The milling cutter 3 is connected to the work spindle 2 by a standard clamping device, preferably a quick-clamping chuck. Further, units can be provided for chip extraction, for delivering and discharging cutting gas, and for cooling.

The apparatus differs from generic prior art devices in that the laser radiation is directed to the workpiece in the milling unit 1 and via the work spindle 2, which is likewise hollow, through a hollow milling cutter 3 coaxial to the milling cutter axis. The diameter of the laser beam bundle in the area where it passes through the milling cutter 3 and the free diameter of the milling cutter 3 must be adapted to one another in such a way that the milling cutter 3 does not cut off edges; that is, the beam bundle has free passage. In a corresponding manner, the milling cutter 3 has a continuous channel with a free diameter around the shaft axis which is greater than the diameter of the laser beam bundle in this area.

Depending on the calculation of the optical transmission system, by which is meant all optically active elements between the laser 4 and the workpiece, it may be necessary to place the last lens (cutting lens) before the workpiece in the milling cutter 3 itself. To this end, the milling cutter 3 can have a larger bore, e.g., with respect to the boring head shank, to a depth determined by the intended position of the cutting lens so that the lens which is placed at the occurring collar can preferably be fixed at the latter. Instead of the cutting lens, a cover glass could also be arranged in order to prevent soiling of the milling unit 1 by the channel.

Cooling channels can be formed in the base body of the milling cutter 3 to cool the cutting lens at higher laser outputs.

The work spindle 2 can also serve as a mount for optical elements as well as for the cutting lens due to the obligatory hollow construction.

The optical transmission system is represented in FIG. 1 by adjustable focusing optics 6, by which the distance of the focus from the front of the milling cutter 3 can be varied, and deflecting elements 5. It will be clear to the person skilled in the art that the transmission system can also comprise imaging elements or deflecting elements, e.g., a telescope, to direct the laser beam through the channel in the milling cutter 3 to the workpiece or layers of the workpiece in a slender, sharply focused bundle, or the focusing optics 6 are not adjustable.

Figure 2:
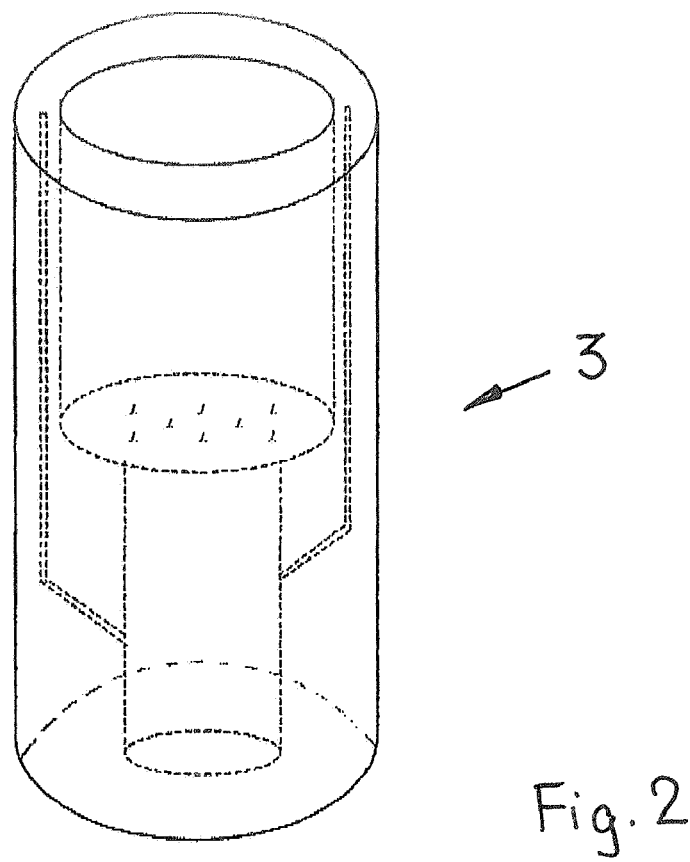
FIG. 2 shows a construction of a milling cutter 3 with mounted lens and flushing channels.

To prevent soiling of the cutting lens or cover glass by combustion residues, flushing channels are advantageously provided in the milling cutter 3. The outlet openings of the flushing channels are located directly below the cutting lens or cover glass so that their workpiece-side surface can be blown clean, chips can be expelled from the channel of the milling cutter 3, and penetrating combustion gases can be blown out. Further, the flushing air can also serve to cool the cutting lens or cover glass. Flushing takes place particularly during machining. FIG. 2 shows a construction of the type mentioned above but does not show the cutting blades. The construction of the cutting blades and their arrangement at the base body of the milling cutter 3 are not essential to the invention; rather, any conceivable construction corresponding to conventional end mills is possible.

Figure 3:
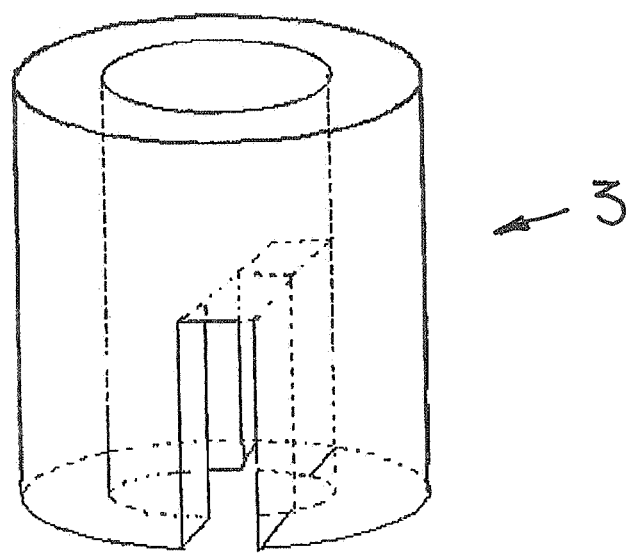
FIG. 3 shows a construction of a milling cutter 3 with cutouts.

Slits (cutouts) are introduced between the circumferential cutting edges at the face of the milling cutter 3 to facilitate the escape of the combustion gases occurring as a result of the laser cutting. These slits advantageously extend from the core circumference of the milling cutter 3 into the channel with respect to depth and as far as possible over the distance of the cutting blades with respect to width. FIG. 3 shows a construction of this kind, wherein only the base body of the milling cutter 3 is shown without any cutting blades.

It will be clear to the person skilled in the art that the construction of the milling cutter 3 with cooling channels, flushing channels and openings does not present alternative constructions as may appear from the drawings, but rather a combined construction.

Because of the hollow construction of the milling cutter 3, front cutters can be formed at the face only within limits and may not project into the free diameter of the milling cutter 3.

Therefore, when the milling cutter 3 cuts into the workpiece perpendicularly, the volume of material below the channel cannot be removed directly. Various solutions to this problem have been proposed.

As frequently applies when using milling cutters having only circumferential cutting edges, the infeed can be carried out with a conventional slot end mill cutter, although it would nullify the advantage in time gained by integrating the laser beam in the milling cutter 3 according to the invention.

Instead of this, the milling cutter 3 could cut into the material at an inclination and, when it reaches the desired cutting depth, can be righted into its perpendicular working position. However, there can be no complete removal of material along this distance in which the milling cutter 3 does not cut into the material in the perpendicular working position. This could be solved by running the milling cutter 3 back counter to the intended milling direction.

The milling cutter 3 could also be formed with inner cutting edges. These inner cutting edges preferably have a greater effective length over the base body of the milling cutter 3 than the circumferential cutting edges. The milling cutter 3 can then remove the residual material after reaching the penetration depth at the start of the forward feed movement in the cutting direction.

However, in an especially advantageous manner this residual material is already evaporated by the laser radiation when cutting in. To this end, the laser beam is defocused by the focusing optics 6 in such a way that it has only a slightly smaller diameter than the channel. The laser parameters such as laser output, pulse frequency and pulse duration are selected in such a way that the removal of material in the interior of the milling cutter 3 is not carried out faster than the cutting of the material by the milling cutter 3. As soon as the milling cutter 3 has reached the desired cut-in depth, the focus of the laser beam is adjusted to a distance from the face that is suitable for the working of the material that remains beneath the milling cutter 3. The milling cutter 3 is now moved in the desired forward feed direction relative to the workpiece. A groove of constant depth is formed. At the same time, this groove is lasered into the base. A continuous cut can be carried out by the laser 4, or blind holes or microperforations of different depths and different distances can be cut.

The invention can be applied in a particularly advantageous manner for milling grooves in a multi-layer workpiece such as an airbag cover at least in a first layer through which perforations are to be lasered in the following layers.

By overlapping the two machining methods, aside from the time saved, chips are also prevented from reaching the beam area and interfering with the laser cutting.

The basic idea of the invention, to integrate a cutting beam in a milling cutter 3, can also be applied for water jet cutting.

While the foregoing description and drawings represent the present invention, it will be obvious to those skilled in the art that various changes may be made therein without departing from the true spirit and scope of the present invention.

REFERENCE NUMBERS

1 milling unit
2 work spindle
3 milling cutter
4 laser
5 deflecting element
6 focusing optics
7 work table

What is claimed is:

1. An apparatus for cutting material comprising:
    a milling unit;
    a milling cutter and a motor-driven work spindle for receiving the milling cutter;
    a laser being connected to an optical transmission system;
    a work table for clamping the workpiece;
    driving units and controlling units for generating and controlling the relative movement of the milling unit and work table in three spatial dimensions and for controlling the laser to perform laser cutting;
    a hollow channel being provided in the milling cutter coaxial to the mill axis,
    and said optical transmission system being for coupling a laser beam generated by said laser coaxially with and into the channel.

2. The apparatus according to claim 1, wherein the optical transmission system comprises adjustable focusing optics by which the distance of the focus of the laser beam from a face of the milling cutter can be varied.

3. The apparatus according to claim 1, wherein the milling cutter has cutouts between circumferential cutting edges thereof to facilitate the escape of combustion gases occurring during the laser cutting.

4. The apparatus according to claim 1, wherein a cutting lens or a cover glass is fitted into the channel of the milling cutter.

5. The apparatus according to claim 4, wherein flushing channels whose outlet openings open into the channel directly below the cutting lens or cover glass are provided in the milling cutter.

* * * * *